US007382229B2

(12) United States Patent
Vuza

(10) Patent No.: US 7,382,229 B2
(45) Date of Patent: Jun. 3, 2008

(54) METHOD OF MANAGING A PLURALITY OF ELECTRONIC MICROCIRCUIT CHIP READERS AND EQUIPMENTS FOR IMPLEMENTING SAID METHOD

(75) Inventor: Dan Tudor Vuza, Bucarest (RO)

(73) Assignee: Gaming Partners International, Savigny-les-Beaune (FR)

( * ) Notice: Subject to any disclaimer, the term of this patent is extended or adjusted under 35 U.S.C. 154(b) by 290 days.

(21) Appl. No.: 10/541,319

(22) PCT Filed: Apr. 7, 2005

(86) PCT No.: PCT/FR2005/000850

§ 371 (c)(1),
(2), (4) Date: Jun. 30, 2005

(87) PCT Pub. No.: WO2006/106192

PCT Pub. Date: Oct. 12, 2006

(65) Prior Publication Data

US 2007/0167134 A1 Jul. 19, 2007

(51) Int. Cl.
*H04B 7/00* (2006.01)

(52) U.S. Cl. .................... 340/10.2; 455/41.2; 340/10.3

(58) Field of Classification Search ............... 340/10.2, 340/825.2, 10.3; 714/712–715; 370/310, 370/321, 324, 345

See application file for complete search history.

(56) References Cited

U.S. PATENT DOCUMENTS 1,624,335 A 4/1927 Greer
1,935,308 A 11/1933 Baltzley
2,410,845 A 11/1946 Snell et al.
2,450,997 A 10/1948 Shann
2,544,118 A 3/1951 Went
2,836,911 A 6/1958 Priesneyer
2,983,354 A 5/1961 Ember et al.
3,034,643 A 5/1962 Keller et al.
3,295,651 A 1/1967 Klackowski et al.
3,306,462 A 2/1967 Cruz
3,439,439 A 4/1969 Stimson
3,670,524 A 6/1972 Korwin
3,766,452 A 10/1973 Burpee et al.

(Continued)

FOREIGN PATENT DOCUMENTS

AU 6854690 9/1991

(Continued)

OTHER PUBLICATIONS

English Language Abstract EP 0815504.

(Continued)

*Primary Examiner*—Brian Zimmerman
*Assistant Examiner*—Yong Hang Jiang
(74) *Attorney, Agent, or Firm*—Greenblum & Bernstein, P.L.C.

(57) ABSTRACT

Method and system for coordinated management of a plurality of contactless radio-frequency readers of chips incorporating electronic microcircuits. The method includes transmitting, in a first time interval, transmit operations composed of command instructions from each of the plurality of readers to the electronic microcircuits of the chips associated with each respective reader; and receiving, in a second time interval, receive operations composed of responses from the electronic microcircuits of the chips associated with each respective reader. The first and second time intervals do not overlap.

18 Claims, 5 Drawing Sheets

U.S. PATENT DOCUMENTS

| | | | | |
|---|---|---|---|---|
| 3,862,400 | A | 1/1975 | Thompson | |
| 3,882,482 | A | 5/1975 | Green et al. | |
| 3,926,291 | A | 12/1975 | Burke et al. | |
| 3,936,878 | A | 2/1976 | Chrysler | |
| 3,953,932 | A | 5/1976 | Graves | |
| 3,968,582 | A | 7/1976 | Jones | |
| 4,026,309 | A | 5/1977 | Howard | |
| 4,183,432 | A | 1/1980 | Lemaire | |
| 4,277,774 | A | 7/1981 | Fujii et al. | |
| 4,283,709 | A | 8/1981 | Lucero et al. | |
| 4,371,071 | A | 2/1983 | Abedor et al. | |
| 4,373,135 | A | 2/1983 | Mohan et al. | |
| 4,395,043 | A | 7/1983 | Gargione | |
| 4,399,910 | A | 8/1983 | Gutentag | |
| 4,435,911 | A | 3/1984 | Jones | |
| 4,511,796 | A | 4/1985 | Aigo | |
| 4,570,058 | A | 2/1986 | Havassy | |
| 4,637,613 | A | 1/1987 | Bishop | |
| 4,638,171 | A | 1/1987 | Gassmann | |
| 4,674,618 | A | 6/1987 | Eglise et al. | |
| 4,675,973 | A | 6/1987 | Siu | |
| 4,725,924 | A | 2/1988 | Juan | |
| 4,755,941 | A | 7/1988 | Bacchi | |
| 4,814,589 | A | 3/1989 | Storch et al. | |
| 4,818,855 | A | 4/1989 | Mongeon et al. | |
| 4,827,640 | A | 5/1989 | Jones | |
| 4,838,404 | A | 6/1989 | Smith et al. | |
| 4,926,996 | A | 5/1990 | Eglise et al. | |
| 4,969,549 | A | 11/1990 | Eglise | |
| 4,973,524 | A | 11/1990 | Huebner et al. | |
| 4,999,742 | A | 3/1991 | Stampfli | |
| 5,007,641 | A | 4/1991 | Seidman | |
| 5,038,022 | A | 8/1991 | Lucero | |
| 5,094,922 | A | 3/1992 | Ielpo et al. | |
| 5,103,081 | A | 4/1992 | Fisher et al. | |
| 5,159,549 | A | 10/1992 | Hallman, Jr. et al. | |
| 5,166,502 | A | 11/1992 | Rendleman et al. | |
| 5,179,517 | A | 1/1993 | Sarbin et al. | |
| 5,216,234 | A | 6/1993 | Bell | |
| 5,265,874 | A | 11/1993 | Dickinson et al. | |
| 5,283,422 | A | 2/1994 | Storch et al. | |
| 5,361,885 | A | 11/1994 | Modler | |
| 5,367,148 | A | 11/1994 | Storch et al. | |
| 5,399,847 | A | 3/1995 | Droz | |
| 5,406,264 | A | 4/1995 | Plonsky et al. | |
| 5,451,756 | A | 9/1995 | Holzer et al. | |
| 5,487,459 | A | 1/1996 | Farmont | |
| 5,498,859 | A | 3/1996 | Farmont | |
| 5,561,548 | A | 10/1996 | Engle | |
| 5,575,374 | A | 11/1996 | Orus et al. | |
| 5,651,548 | A | 7/1997 | French et al. | |
| 5,673,502 | A | 10/1997 | Caterbone | |
| 5,735,742 | A | 4/1998 | French | |
| 5,770,533 | A | 6/1998 | Franchi | |
| 5,794,532 | A | 8/1998 | Gassies et al. | |
| 5,883,582 | A * | 3/1999 | Bowers et al. | 340/10.2 |
| 5,895,321 | A | 4/1999 | Gassies et al. | |
| 5,941,769 | A | 8/1999 | Order | |
| 6,021,949 | A | 2/2000 | Boiron | |
| 6,176,185 | B1 | 1/2001 | Charlier et al. | |
| 6,264,109 | B1 | 7/2001 | Chapet et al. | |
| 6,467,413 | B1 | 10/2002 | Charlier et al. | |
| 6,581,747 | B1 | 6/2003 | Charlier et al. | |
| 2002/0063035 | A1 | 5/2002 | Blad et al. | |
| 2002/0185019 | A1 | 12/2002 | Tollhupp | |
| 2004/0014838 | A1 | 1/2004 | Tollhupp | |
| 2004/0140884 | A1 * | 7/2004 | Gallagher et al. | 340/10.2 |
| 2004/0229682 | A1 | 11/2004 | Gelinotte | |
| 2005/0088284 | A1 * | 4/2005 | Zai et al. | 340/10.2 |
| 2006/0022800 | A1 * | 2/2006 | Krishna et al. | 340/10.2 |
| 2006/0022815 | A1 * | 2/2006 | Fischer et al. | 340/505 |

FOREIGN PATENT DOCUMENTS

| | | |
|---|---|---|
| DE | 8909783 | 10/1990 |
| DE | 29505951 | 7/1995 |
| EP | 0232174 | 8/1987 |
| EP | 0266497 | 5/1988 |
| EP | 0360613 | 3/1990 |
| EP | 0436497 | 7/1991 |
| EP | 0436502 | 7/1991 |
| EP | 0444373 | 9/1991 |
| EP | 0555683 | 8/1993 |
| EP | 0564051 | 10/1993 |
| EP | 0570874 | 11/1993 |
| EP | 0769770 | 4/1997 |
| EP | 0815504 | 1/1998 |
| FR | 2663145 | 12/1991 |
| FR | 2727032 | 5/1996 |
| GB | 1599120 | 9/1981 |
| GB | 2075732 | 11/1981 |
| GB | 2077556 | 12/1981 |
| GB | 2149623 | 6/1985 |
| GB | 2153128 | 8/1985 |
| GB | 2180086 | 3/1987 |
| GB | 2191368 | 12/1987 |
| GB | 2229845 | 10/1990 |
| WO | 87/04551 | 7/1987 |
| WO | 88/01082 | 2/1988 |
| WO | 91/06068 | 5/1991 |
| WO | 92/21105 | 11/1992 |
| WO | 94/16407 | 7/1994 |
| WO | 95/08164 | 3/1995 |
| WO | 96/07153 | 3/1996 |
| WO | 96/14115 | 5/1996 |
| WO | 96/17329 | 6/1996 |
| WO | 97/27526 | 7/1997 |
| WO | 97/30414 | 8/1997 |
| WO | 99/25439 | 5/1999 |
| WO | 01/08080 | 2/2001 |
| WO | 02/47023 | 6/2002 |
| WO | 03/049048 | 6/2003 |
| WO | 2004/102731 | 11/2004 |
| ZA | 9010453 | 10/1991 |

OTHER PUBLICATIONS

English language Abstract of FR 2663145.
English language Abstract of 2727032.
U.S. Appl. No. 10/547,501, filed Aug. 31, 2005.

* cited by examiner

METHOD OF MANAGING A PLURALITY OF ELECTRONIC MICROCIRCUIT CHIP READERS AND EQUIPMENTS FOR IMPLEMENTING SAID METHOD

CROSS-REFERENCE TO RELATED APPLICATIONS

The instant application is a U.S. National Stage of International Application No. PCT/FR2005/000850 filed on Apr. 7, 2005.

The present invention relates generally to the field of chips incorporating an electronic microcircuit and contactless radio-frequency readers of such microcircuit chips, these readers, also known as RFID (Radio-Frequency IDentification) readers, being adapted to operate in read mode and/or in write mode.

More particularly, although this is not limiting on the invention, the latter finds its application in the field of casinos or gaming rooms for managing a large number of gaming chips, also known as casino gaming chips, distributed between the bank of the casino, cashiers, change tables and gaming tables. Using contactless radio-frequency readers communicating with the microcircuits of the gaming chips facilitates the work of the casino operator, in particular through the detection of counterfeit gaming chips, the location and tracking of gaming chips in the casino, the counting of gaming chips (number and value), surveillance of transactions at the change tables or gaming tables, etc.

In the remainder of this description the expression gaming chip means any element in the form of a disc or a plate, usually fabricated from rigid plastics material. The chips carry patterns varying in design and in color to form a more or less complex decoration and to reduce the risk of counterfeiting and/or fraudulent reproduction. Certain chips incorporate an electronic circuit (electronic circuit and memory) which stores information concerning the chip, in particular its serial number or identification code and its value. Chips of this kind equipped with electronic circuits and memory are also known as electronic microcircuit chips or electronic memory chips. Depending on the design of the chip, the electronic circuits are of the basic read-only memory (PROM) type, the reprogrammable memory (EEPROM) type, that can be read and/or written, or even of the type with a microprocessor and accompanying memory. Finally, the electronic circuits of the microcircuits or electronic circuits include a coil forming part of a contactless radio-frequency transponder for communicating by way of magnetic coupling to the antennas of the radio-frequency readers, the electric field radiated by the antennas of the readers being also used to generate the electrical energy necessary for the microcircuits. In practice, signals carrying information are communicated by modulation/demodulation of a carrier wave at a predetermined frequency, for example 125 kHz (this value is not limiting on the invention).

In the remainder of the description, and without limiting the invention in any way, the term reader is to be understood in the widest sense as meaning a device intended in particular for reading and/or writing the memory of the microcircuit. Each reader is associated with a microprocessor-based control unit that sends commands and data to a microcircuit within the field of the corresponding antenna and receives and processes responses therefrom, certain readers being able to monitor a plurality of antennas in turn. In practice, a central reader control unit managing a plurality of readers is used.

The benefits of introducing microcircuit gaming chip readers into casinos are encouraging operators to use more of them and to reduce the distance between the antennas corresponding to two different readers. This results in the risk of interference affecting communications between microcircuits and readers, which is more serious at the level of reception by the readers, the intensity of the signal produced by the coil of the microcircuit being much lower than the intensity of the signal produced by the antenna of a reader. Thus reception by one reader may suffer seriously from interference caused by simultaneous transmission from an antenna of a neighboring reader that is too close to it. This unsatisfactory situation is encountered if a plurality of readers are disposed fairly close together, for example on change tables or on the same gaming table, such as a roulette or blackjack table, where the distance between antennas may be as little as 30 cm. The solution consisting in equipping the tables concerned with an electromagnetic shield around the antennas is inconvenient or even difficult to put into practice, often through lack of space, and in the final analysis would not appear to be highly effective.

SUMMARY OF THE INVENTION

An object of the invention is to propose a method of managing a plurality of contactless radio-frequency gaming chip readers that eliminates interference between readers caused by uncoordinated transmission and reception, in particular via antennas that are close together, or at least to reduce very significantly the effects of interference on go and/or return communications between readers and microcircuits.

To this end, the invention proposes a method for coordinated management of a plurality of contactless radio-frequency readers of gaming chips incorporating an electronic microcircuit, wherein a current transmit/receive cycle Tx/Rx between a reader and the microcircuits accessible by the reader includes a transmit operation Tx of transmitting a command instruction from the reader to the microcircuits followed by a receive operation Rx of the reader receiving the responses from the microcircuits, characterized in that the transmit/receive cycles Tx/Rx of the active readers are synchronized to group the transmit operations Tx in a first time interval and to group the receive operations Rx in a second time interval with no overlap between the two time intervals.

Thus synchronizing Tx/Rx cycles by separately grouping transmit operations Tx, on the one hand, and receive operations Rx, on the other hand, enables a plurality of readers with antennas that are close together to operate simultaneously, the final time saving for processing a batch of gaming chips shared between Nx readers active simultaneously, compared to processing that batch with a single reader or with the Nx readers operating successively to avoid the interference referred to above, being much greater than the delay introduced by the synchronization process. It should be noted that the only readers affected by the synchronization process are the Nx active readers from the plurality of NL readers for which a Tx/Rx cycle is waiting, without prejudice to any generalization to or assimilation of other readers of the plurality if necessary, for example as will become apparent hereinafter in the case of disconnection of power from and reconnection of power to the antennas (this example is not limiting on the invention).

In a preferred embodiment of the method of the invention, the transmit operations Tx are grouped so that they finish at substantially the same time.

This grouping minimizes the time necessary for the transmit operations Tx grouped in this way (in this instance the longest duration of a transmission operation Tx) and permits that the receive operations Rx are started immediately after the time at which the transmit operations Tx end, so as also to reduce the time necessary for the receive operations Rx grouped in this way to the longest receive time.

In a first advantageous variant of the method of the invention, the synchronization process includes:

collecting the durations TxL of the transmit operations Tx for sending command instructions of the first awaiting Tx/Rx cycles of the active readers, (certain command protocols being able to take the form of a succession of several Tx/Rx cycles) and sending the active readers instructions to execute the transmit operations Tx for sending the command instructions of the Tx/Rx cycles spread over time in order of decreasing duration TxL, beginning with the reader assigned the command instruction of the Tx/Rx cycle having the greatest duration TxL, the delay between one execution instruction and the next being equal to the difference between the durations TxL of the Tx/Rx cycle command instructions to be transmitted by the corresponding two readers, up to the execution instruction associated with the shortest duration TxL.

A process of the above kind structured in the above manner may be implemented by hardware and/or software solutions, as will become apparent in more detail hereinafter.

Moreover, it is desirable or necessary to disconnect the power from the antenna for reasons of power saving and/or of returning the microcircuits of gaming chips disposed in the field of an antenna of a reader to a standby state. Disconnecting and reconnecting power to the antennas can cause interference, in particular to receive operations Rx, until the antenna current has stabilized. The following variant of the method of the invention provides an advantageous solution to this problem.

According to another optional but advantageous variant of the method of the invention, the synchronization process includes synchronizing instructions CA for connecting power to or disconnecting power from the antenna of one or more readers of said plurality of readers:

these instructions CA simulating command instructions of a Tx/Rx cycle to an active reader, the time for the antenna current to stabilize after the execution of an instruction CA simulating the time TxL of the transmit operation Tx sending the Tx/Rx cycle command instruction to the active reader, said stabilization time being referred to hereinafter as the simulated duration TxL, and the instruction CA being referred to hereinafter as the simulated transmit operation Tx, and an instruction to execute an instruction CA simulating an instruction to execute a transmit operation Tx of a Tx/Rx cycle in which the receive operation Rx has a null duration, hereinafter referred to as a simulated Tx/Rx cycle, the reader concerned by an instruction CA then simulating an active reader.

This variant eliminates the interference caused by disconnecting and reconnecting the power to the antenna and achieves this without impeding the coordinated management of the plurality of readers and at lower cost in terms of hardware and software resources.

To improve further the synchronization between readers, the real and/or simulated durations TxL take the form of multiples of the period of the carrier used by the readers.

The synchronization process is advantageously effected by a synchronization circuit in accordance with a synchronization cycle CS initiated either by the first request for authorization to execute a real or simulated Tx/Rx cycle submitted by a reader following a request from a central control unit of the reader, or automatically at the end of the last receive operation Rx of real Tx/Rx cycles corresponding to the preceding synchronization cycle CS or, if there is no real Tx/Rx cycle, at the end of the simulated transmit operations Tx.

The synchronization process of the above embodiment of the method of the invention really involves, of the plurality of NL readers whose management is coordinated, only the Nx readers that are active (having a Tx/Rx cycle waiting).

All the readers that have transmitted requests for authorization to execute a real or simulated Tx/Rx cycle since the start of execution of the preceding synchronization cycle CS advantageously participate in a new synchronization cycle CS.

This embodiment of the method of the invention limits the time active readers wait for instructions to execute transmit operations Tx.

All active readers that have participated in the preceding synchronization cycle advantageously also participate in the new synchronization cycle CS.

This embodiment of the method of the invention enables automatic processing of series of Tx/Rx cycles for the same reader with no risk of interruption.

For each synchronization cycle CS, the step of collecting real and/or simulated durations TxL is advantageously effected for all the NL readers of the plurality of readers, with determination of the number Nx of readers for which an instruction to execute the real or simulated transmit operation Tx must be sent, and the step of sending instructions to execute the transmit operation Tx is adapted as a function of Nx.

This embodiment of the method of the invention saves time in the execution of the synchronization cycle.

In another optional but advantageous variant of the method of the invention, the clock signals of each reader of the plurality of readers are synchronized to the same timebase.

This variant enables the readers to generate carrier waves synchronized to the selected frequency, for example 125 kHz (this example is not limiting on the invention).

According to a further optional but advantageous variant of the method of the invention in which it is intended to be used with readers having the function of detecting and managing collisions at the level of simultaneous responses of a plurality of microcircuits to the same command instruction of a Tx/Rx cycle, the method is characterized in that it is associated with a system adapted to implement the following accelerated collision management process:

on detection of a collision by virtue of a mismatch between the value '0' or '1' of a bit of the response and the expected value for that bit, determining the "strong" or "weak" nature of the collision as a function of the level of uncertainty as to the detected value of the response bit concerned; and iteratively processing collisions, only "strong" collisions being processed on the first iteration.

In this variant there are processed during the first iteration of the method only "strong" collisions (for example, reading by a reader of a response to a request for identification of a chip with a given serial number held in the memory of its own microcircuit by the microcircuit of another chip having an adjacent serial number); thus false collisions (generally resulting from difficulty reading the value of the bit concerned in the response, and thus from a high level of uncertainty in relation thereto) are eliminated from processing in the first iteration. One non-limiting example of this processing is obtaining confirmation by targeted interrogations of certain serial number fields of the number of the gaming chip originating the response, even if that means eliminating the incriminated gaming chip by "silencing" it (inhibiting the receive operation Rx), if the latter is not one of the gaming chips looked for. This embodiment very significantly accelerates the management of real collisions and chip reading and/or writing times. It is to be noted that each false collision increases the reading time unnecessarily because of the resulting attempts to discover serial numbers SNR that in reality do not exist; hence the necessity of avoiding such collisions.

Discrimination between "strong" and "weak" collisions is advantageously obtained by fixing for each reader a predetermined sharing threshold associated with the level of uncertainty as to the detected value of the response bit concerned.

This embodiment adapts the sharing threshold to each reader and to its immediate environment (distance between reader antennas, shapes and/or disposition of the antennas, real power dissipated, etc).

The sharing threshold is advantageously selected to distinguish between real collisions, "strong" collisions resulting from simultaneous responses from a plurality of microcircuits separate from false collisions, and "weak" collisions resulting in particular from electromagnetic interference external to the readers or interference between readers with antennas in close proximity during sending of the responses Rx.

The invention also provides a synchronization circuit for a plurality of contactless radio-frequency readers of chips incorporating an electronic microcircuit adapted to implement the method according to the invention described above in all its variants, the circuit including a microprocessor-based processing unit that is adapted to effect the synchronization and is associated with an interface circuit adapted to be readily connected to each of the readers of said plurality of readers. To this end, the processing unit includes hardware and software enabling it to execute the synchronization process.

It is also to be noted that the synchronization circuit is capable of working autonomously, for example so that it can be installed alongside the readers of the same casino table, but may equally well be integrated into or connected to the central reader management unit.

The interface circuit advantageously includes an arrangement for demultiplexing data transmission lines from the readers.

The interface circuit optionally and advantageously includes an arrangement for delivering to the readers clock signals synchronized to the timebase of said processing unit of the synchronization circuit.

The invention also provides a contactless radio-frequency read/write reader system of chips incorporating an electronic microcircuit adapted to implement the method according to the invention in conjunction with a synchronization circuit as defined hereinabove, the reader including a clock signal switching arrangement for switching from an internal timebase to the timebase of said processing unit.

The invention also provides a contactless radio-frequency read/write reader system of chips incorporating an electronic microcircuit adapted to implement the method according to the invention in conjunction with a synchronization circuit as defined hereinabove, the reader having hardware and software enabling it to effect synchronization within a plurality of readers, the coordinated management of read and/or write cycles Tx/Rx, in particular in the variant controlling connection of power to and/or disconnection of power from the antennas and/or in the variant employing the accelerated collision management process.

The invention also provides a contactless radio-frequency reader and/or writer of chips incorporating an electronic microcircuit adapted to implement the method according to the invention in all its variants, including a plurality of readers as defined hereinabove connected to a synchronization circuit as defined hereinabove and managed by a microprocessor-based central control unit.

The invention also provides a contactless radio-frequency reader and/or writer of chips incorporating an electronic microcircuit adapted to implement the method according to the invention in all its variants, including a plurality of readers as defined hereinabove using adaptation of the clock signal and synchronized by the timebase of a synchronization circuit as defined hereinabove.

BRIEF DESCRIPTION OF THE DRAWINGS

Other features and advantages of the present invention will become apparent on reading the following description, which is provided by way of nonlimiting example only and with reference to the appended drawings, wherein.

DETAILED DESCRIPTION OF THE PRESENT INVENTION

Figure 3:
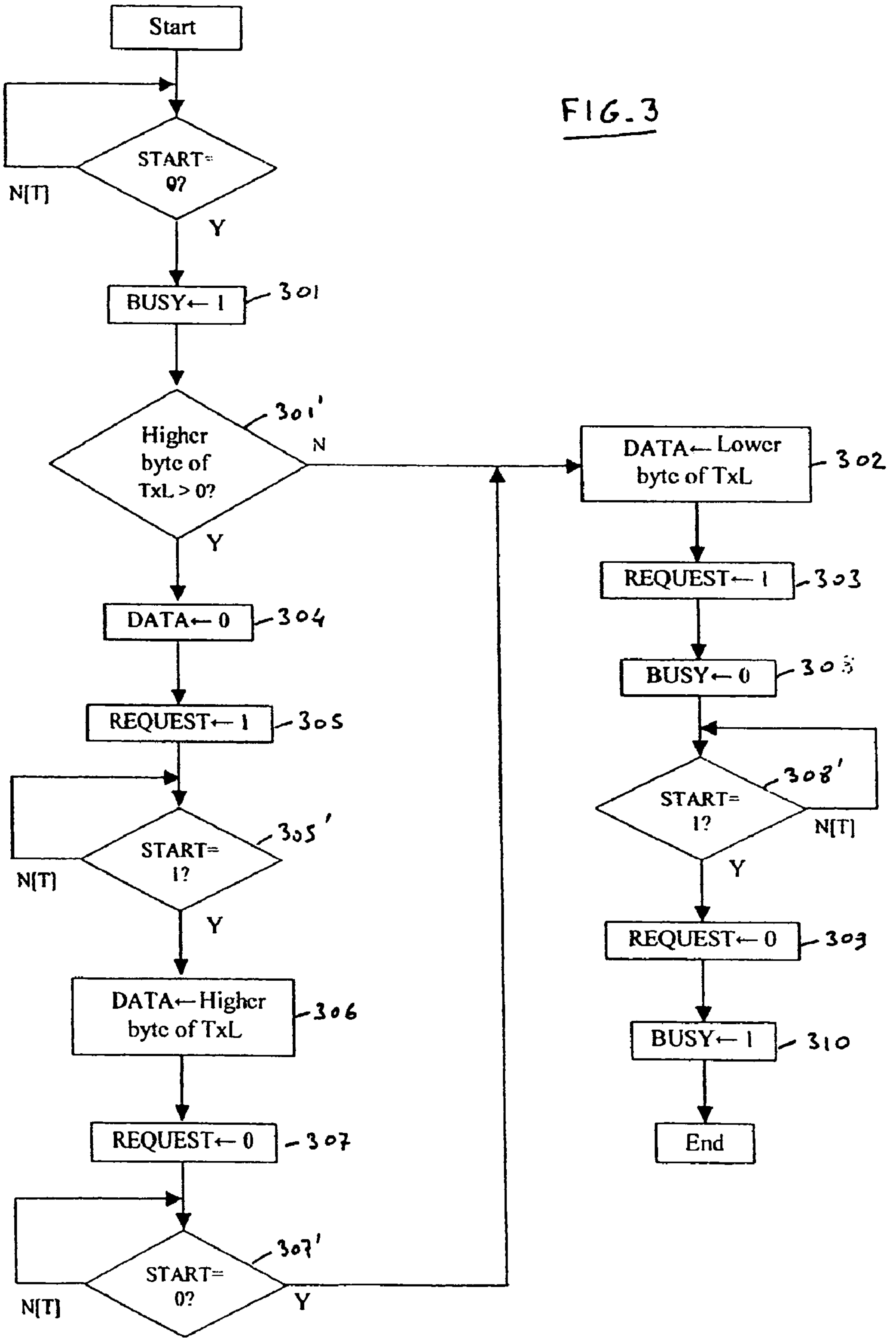
FIG. 3 is a flowchart of operations effected by a reader during the execution of a synchronization cycle CS in the context of implementation of the method of the invention, in particular the protocol for transferring times TxL to the synchronization circuit.

The embodiment of a contactless radio-frequency system 10 according to the invention for reading and/or writing chips incorporating an electronic microcircuit intended to be used in conjunction with the method of the invention shown diagrammatically in FIG. 3 includes, by way of non limiting example, a plurality of readers 12 comprising three readers L1, L2 and L3 respectively identified by the reference numbers 12*a*, 12*b*, 12*c*. Each reader includes a respective antenna 13*a*, 13*b*, 13*c* associated with the tabletop 14 of the same gaming table or cashier table for defining corresponding reading/writing areas in which are placed gaming chips 15*a*, 15*b* and 15*c* (in the form of plates or discs) incorporating an electronic microcircuit, either flat and individually (gaming chips 15*b*) or stacked up (gaming chips 15*a* and 15*c*), the stacks containing 20 or more gaming chips.

Again by way of non-limiting example, the three readers 12*a*, 12*b* and 12*c* are of the VEGAS read-write device type (version VEGRED2) from Gaming Partners International SAS. Each gaming chip incorporates an electronic microcircuit 16 with a contactless radio-frequency transponder, in this instance a Hitag Vegas transponder from Philips Semiconductors.

The three readers 12*a*, 12*b* and 12*c* are connected via RS232 serial interfaces 17*a*, 17*b* and 17*c* to the same host computer OH 18 defining a central reader control unit transmitting commands to readers and using data supplied thereby. It is to be noted that, in a variant that is not shown, and without departing from the scope of the invention, each reader may have its own central control unit (computer OH); for example, there could be in total one synchronization card, three readers and three independent computers OH. Each reader 12*a*, 12*b* or 12*c* includes in particular a reader microprocessor μP (not shown) and a digital signal processor DSP (not shown), used in particular for executing the anticollision algorithm. The three readers 12*a*, 12*b* and 12*c* are generally loaded with the same software and configured identically so that the operating characteristics of the three readers 12*a*, 12*b* and 12*c* are identical (except for the identity specific to each reader).

Thus the transmission Tx of a command to the microcircuits by a reader (12*a*, 12*b* or 12*c*) is effected by strong modulation of the current of the antenna associated with the reader, which is detected by microcircuits 16 in the field thereof. Similarly, the reception Rx by the reader of the response from the microcircuits to a command is effected by the reader detecting the weak modulation of the antenna voltage.

The energy necessary for the microcircuit 16 to function is supplied by the magnetic field of the antenna of the corresponding reader. The reader (12*a*, 12*b* or 12*c*) sends commands to the microcircuits by modulating the amplitude of the oscillations of the magnetic field. The microcircuits respond by modulating an internal resistance, magnetic coupling transmitting this modulation to the reader.

Again by way of nonlimiting example, the following states characterize the operation of the Hitag type microcircuit 16.

Off. The microcircuit is out of the field of the antenna.

Ready. The microcircuit has just been placed in the field of the antenna. In this state it accepts only the command SetCC, after which it sends the serial number (SNR) to the reader and goes to the Initial state.

Initial. In this state the microcircuit accepts the following commands:

SetCC—same effect as in the Ready state.

ReadID—the reader sends N bits to the microcircuits ($1 \leqq N \leqq 31$). The microcircuits in which the first N bits of the SNR coincide with the N bits received respond by sending the other 32-N bits of the SNR; the other microcircuits go to the Ready state.

Select—the reader sends 32 bits to the microcircuits. The microcircuit whose SNR coincides with the bits received responds by sending the data of its configuration page in memory and goes to the Selected state; the other microcircuits go to the Ready state.

Selected. In this state the microcircuit accepts the commands for reading and writing data and the command Halt, after which it goes to the Silent state.

Silent. In this state the microcircuit does not respond to any command, thus enabling the reader to communicate with the other microcircuits. The only way to quit this state is to return to the Off state.

It can happen that a plurality of microcircuits send their responses at the same time following the commands SetCC and ReadID. The responses of the microcircuits are synchronized, in particular by the clock of the reader when the latter is operating in the independent reader mode; they therefore contain 32 bits for the SetCC command and 32-N bits for the ReadID command. If the responses differ at certain bit positions, then collisions are said to occur at the corresponding positions. The reader detects and processes these collisions by way of the anticollision algorithm.

To enable the microcircuits 16 to exit the Silent state, the reader can use the command HFReset to temporarily disconnect power from the antenna. It can also use the command SetPowerDown to disconnect power from the antenna during periods of inactivity.

The three readers 12*a*, 12*b* and 12*c* are also connected to a synchronization circuit CSL 20 taking the form of an electronic circuit card carrying the following three main components: an ATMEL AT89C55WD microprocessor-based processing unit 22, a Xilinx CPLD XC9672 interface circuit 24, and a Maxim MAX202 serial interface 26.

The microprocessor 22 executes the synchronization protocol of the invention. It also communicates, via the serial interface 26, with a computer connected to the CSL circuit (in this example this is advantageously, although not necessarily, the computer 18), with which tests may be carried out to verify if all the components of the system (CSL circuit, readers 12*a*, 12*b* and 12*c* and connecting cables 17*a*, 17*b* and 17*c*) are operating correctly. It will be noted, however, that the presence of a computer is not required for the CSL circuit 20 during normal operation of the system 10 of the invention.

The interface circuit 24 has the following functions:

It provides the interface between the microprocessor 22 and the three readers 12*a*, 12*b* and 12*c*; in particular, it acts as a demultiplexer between the microprocessor 22 and the DATA lines.

It distributes to the readers a 4 MHz signal obtained by dividing down the 20 MHz frequency of the timebase of the microprocessor 22. This signal is used by the readers 12*a*, 12*b* and 12*c* to generate the carrier waves synchronized to 125 kHz.

It initializes the microprocessor 22 on power up and reinitializes it in the event of the program locking up. To this end, the interface circuit 24 includes a "watchdog" type subcircuit (not shown) for this purpose having an input controlled by the microprocessor 22 and an output that controls the RESET signal of the microprocessor. If the microprocessor 22 does not activate the input of the sub-circuit for a certain time period, the sub-circuit activates the RESET signal. This solution is preferred over using the watchdog circuit integrated into the microprocessor or a capacitor associated with the RESET line because the latter two options are unable to start up the microprocessor correctly on power up because one reader 12*a*, 12*b* or 12*c* may be powered up before the circuit 24 and a few logic lines connecting that reader to the circuit 24 might happen to be high (the reader normally resets them to low when it is powered up). Under these conditions, it is possible for the voltage present on these lines to generate a partial start-up of the microprocessor 22, sufficient to discharge a capacitor connected to its RESET line but insufficient to activate the whole of the processor correctly, in particular its watchdog circuit. Accordingly, the microprocessor 22 would not start when powered up with a delay relative to the reader. On the contrary, the subcircuit would commence to function at this time and there would be no delay in it activating the RESET signal of the microprocessor 22.

Figure 5:
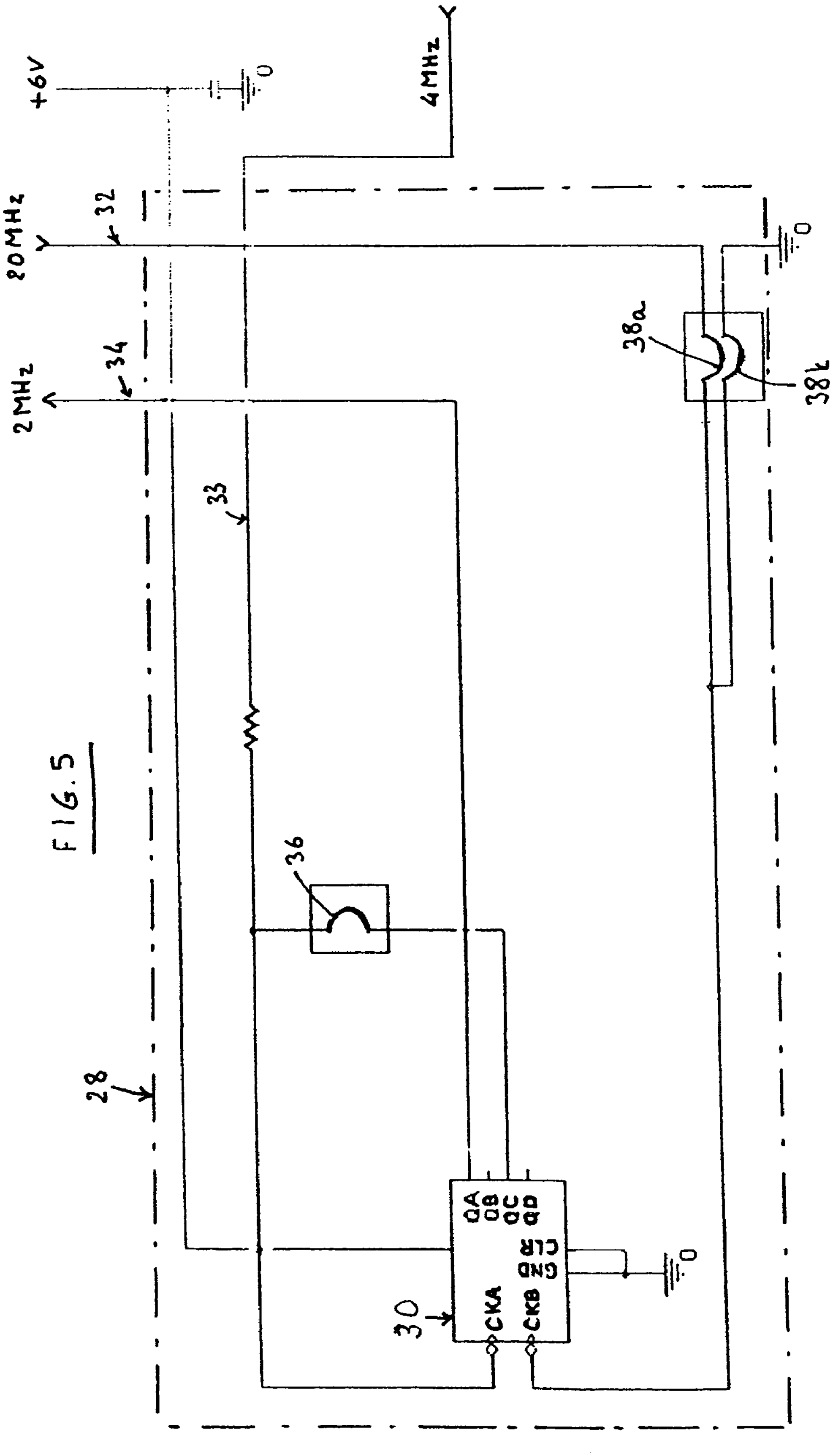
FIG. 5 is a diagram of a clock switching circuit for changing a reader from an 'independent reader' mode to a 'synchronized reader' mode.

To enable the readers 12*a*, 12*b* and 12*c* to receive the 4 MHz signal supplied by the circuit 24 (where applicable after disabling the internal clock divider circuit of the reader associated with the microprocessor of the latter), it is important to associate with each reader a clock switching circuit, for example the switching circuit 28 shown in FIG. 5, which is based on the Philips Semiconductors 74HC390 integrated circuit 30 and enables the reader to function in the synchronized reader or independent reader mode.

In the independent reader mode, the counter/dividers by 5 (terminals CKB/QC) and by 2 (terminals CKA/QA) of the integrated circuit 30 are connected in series, to obtain division by 10 of the frequency of the 20 MHz signal supplied by the internal processor of the reader (line 32), which yields the signal at 2 MHz (line 34) that the reader needs to generate the carrier wave and other signals required for transmit operations Tx and receive operations Rx. To this end, the single jumper 36 and the jumper 38*a* are closed and the jumper 38*b* is open.

In the synchronized reader mode (which is the mode of the readers 12*a*, 12*b* and 12*c* in the present situation), the divider by 5 is idle and the signal at 4 MHz supplied by the circuit 24 (line 33) passes through the divider by 2 (CKA/QA); there is therefore obtained on the line 34 the signal at 2 MHz needed by the reader; passing this signal through the divider (CKA/QA) also has the object of ensuring clean transitions in the signal, eliminating possible interference introduced by the transmission cable. To this end, the single jumper 36 and the jumper 38*a* are open and the jumper 38*b* is closed.

The 2 MHz signals are therefore synchronized for all the readers 12*a*, 12*b* and 12*c* because they come from a common timebase, that of the microprocessor of the central processing unit 22 of the synchronization circuit 20.

The method of the invention for coordinated management of the plurality of readers (three readers) 12*a*, 12*b* and 12*c* is implemented in the following manner.

Each reader 12*a*, 12*b* or 12*c* acts in response to commands received from the central management unit 18 (also referred to hereinafter as the computer OH). After any such command, the reader undertakes actions comprising zero, one or more than one Tx/Rx cycles.

For what it is worth, it should be remembered that the Tx/Rx cycle proper of the readers comprises two steps: the transmission (transmit operation Tx) of a command from the reader to the microcircuits, followed by the reception by the reader (receive operation Rx) of the response from the microcircuits. In the particular, but non-limiting, situation of the readers 12*a*, 12*b* or 12*c*, the response Rx from the microcircuits is automatic and follows on almost immediately from the end of the transmission operation Tx from the reader concerned.

In the case of a synchronized reader, a Tx/Rx cycle is preceded by an additional synchronization process that in particular precedes and coordinates the transmission operation Tx for the command relative to Tx commands of the other readers. The object of this process is to ensure that no Tx time interval of one reader is superimposed on any Rx time interval of another reader, and thus that the strong modulation of the operations Tx does not interfere with the weak modulation of the operations Rx. In other words, the function of the synchronization process is to group into a first time interval the transmit operations Tx and to group into a second time interval the receive operations Rx, with no overlap between the two time intervals. In a preferred embodiment of the coordinated management method of the invention, the readers 12*a*, 12*b* and 12*c* are synchronized in such a manner that all the transmit operations Tx of the active readers finish at the same time, allowing the receive operations Rx to begin at the same time. The process is implemented by executing a synchronization cycle CS described hereinafter.

Initially each reader 12*a*, 12*b*, 12*c*, activated by a command from the computer OH 18, calculates the duration TxL of the corresponding transmit operation Tx as a 16-bit integer expressing the duration of the command in multiples of the period of the 125 kHz carrier (8 microseconds). This duration is then communicated via the interface circuit 24 to the synchronization circuit CSL 20, after which the reader waits for the START signal. Only after it has received this START signal from the CSL circuit 20 does the reader execute the Tx/Rx cycle, i.e. the operation Tx of transmitting the command to the microcircuit 16 and the operation Rx of receiving from the microcircuit.

Figure 1:
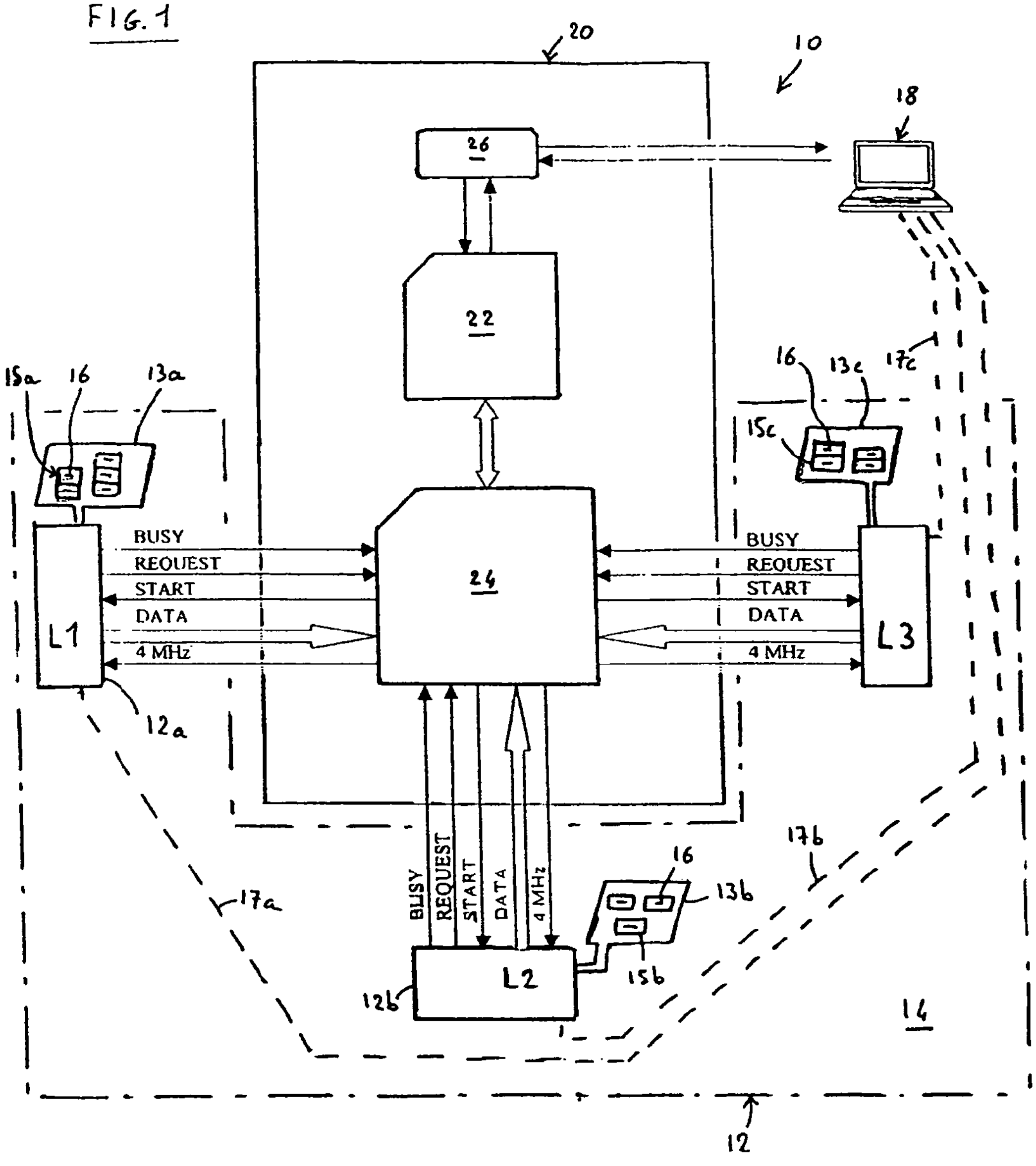
FIG. 1 is a diagram of one embodiment of a contactless radio-frequency system in accordance with the invention for reading and/or writing chips provided with electronic microcircuit intended to be used in conjunction with the method of the invention.

To be able to communicate the numbers TxL to the circuit CSL 20, each of the three readers 12*a*, 12*b* and 12*c* is connected to the interface circuit 24 by way of the following logic lines (see FIG. 1):

8 DATA lines in the reader-CSL circuit direction;
1 BUSY line in the reader-CSL circuit direction;
1 REQUEST line in the reader-CSL circuit direction;
1 START line in the CSL circuit-reader direction.

If the higher byte of the duration TxL has a null value, the transfer of TxL to the CSL circuit 20 is effected in a single step, using the 8 DATA lines to transfer the lower byte. If the higher byte does not have a null value, the transfer is effected in three steps. A byte equal to 0 is transferred first; as this is not a valid value for a duration TxL, it tells the CSL circuit 20 that a two-step transfer is to follow, namely the higher byte then the lower byte of the duration TxL.

The values assigned to the BUSY and REQUEST lines by the reader 12*a*, 12*b* or 12*c* concerned (see FIG. 1) have the following meanings:

BUSY=0, REQUEST=0—the reader does not participate in the current synchronization cycle CS (reader inactive);
BUSY=1, REQUEST=1—the reader had just transferred the lower byte of TxL or a byte that has a null value;
BUSY=1, REQUEST=0—the reader has just transferred the higher byte of TxL;
BUSY=0, REQUEST=1—the reader is waiting for the START signal.

From the point of view of the CSL synchronization circuit 20, a synchronization cycle CS commences when a '1' is detected on at least one of the REQUEST lines. The cycle comprises two main steps: i) collecting the numbers TxL, extending from the commencement of the CS cycle (see FIG. 4, step 400) to the detection of a '0' on all the BUSY lines (see figure, step 404); ii) distributing the START signals as a function of the numbers TxL. After these two main steps, the CSL circuit 20 returns to the idle state until a new cycle commences.

Figure 4:
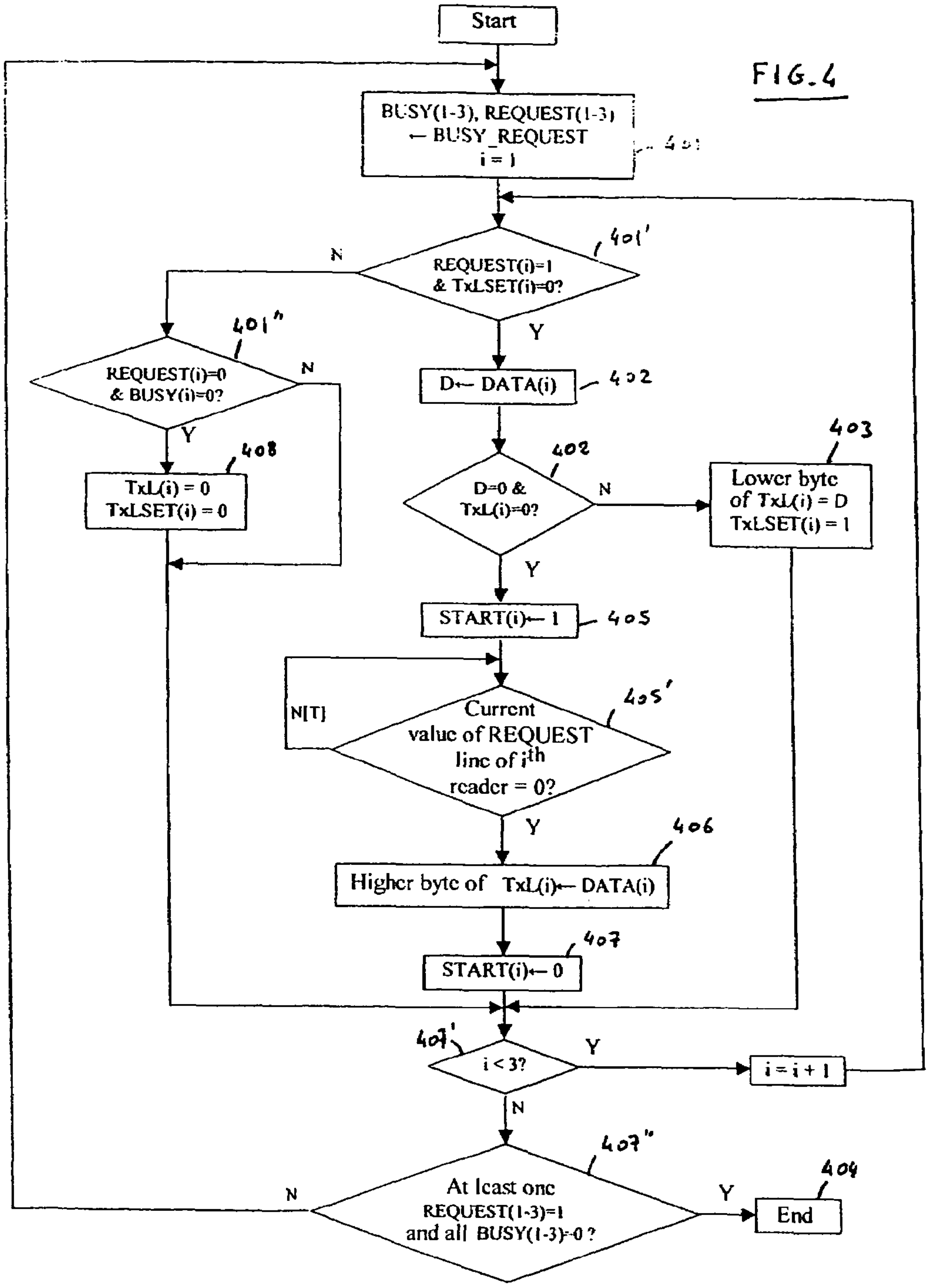
FIG. 4 is a partial flowchart of operations effected by the synchronization circuit during execution of the synchronization cycle CS shown in FIG. 3, in particular the protocol for collection of numbers TxL by the synchronization circuit.

In FIGS. 3 and 4, the symbol ← (small arrow pointing to the left) is used to designate either the transfer of values of variables or of constants situated to the right of the sign on the logic lines on the left or the storage in memory of the values of the logic lines on the right in the variables on the left. The symbol [T] signifies that the wait for a certain logic condition to be satisfied is not extended to infinity, but until a time-out expires that is reset to 0 on the first verification of the condition in question; the object of this is to avoid the system locking up in an infinite loop in the event of defective operation of one of its components or connecting cables.

Figure 2:
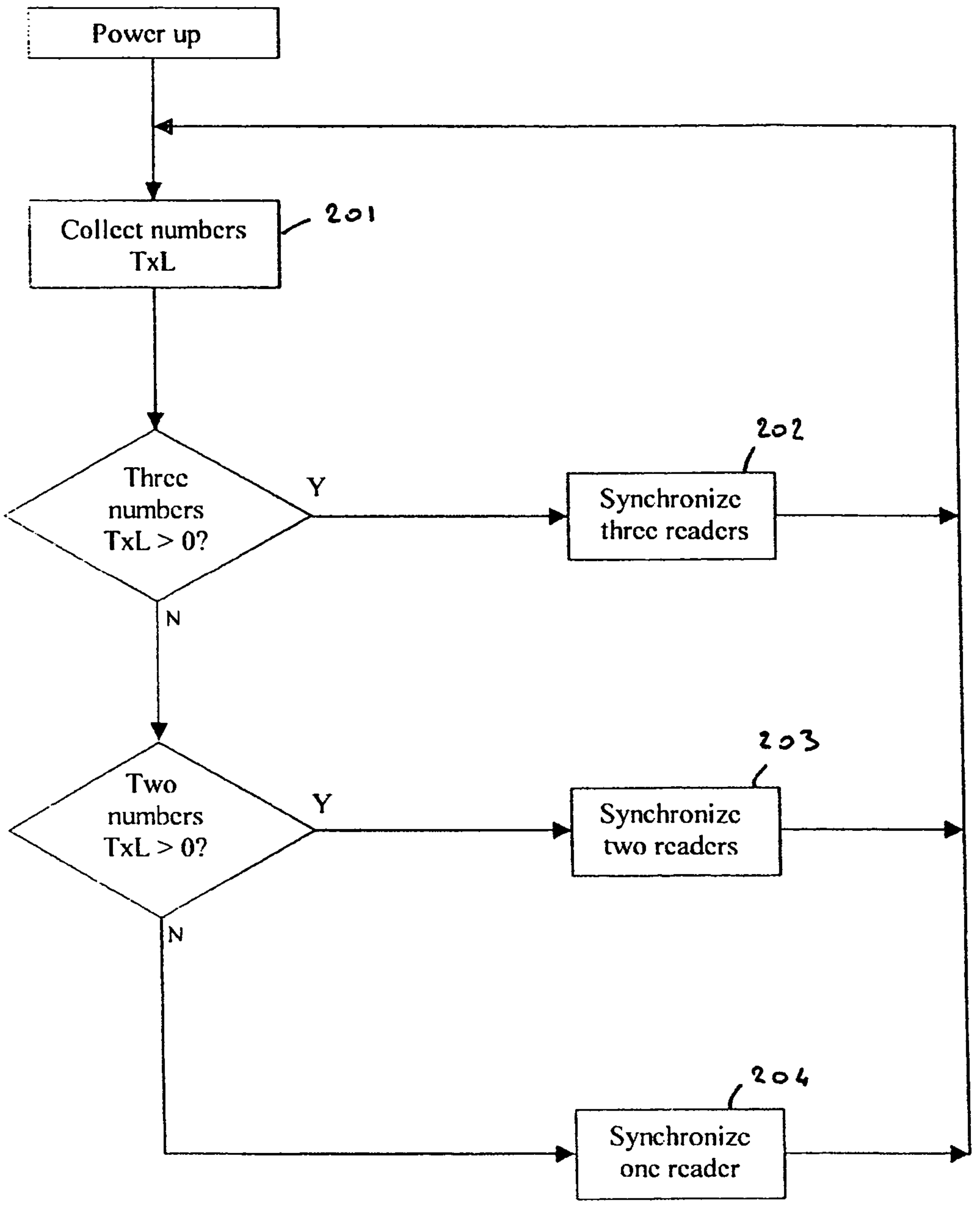
FIG. 2 is a general flowchart of the operations effected by the synchronization circuit in the context of implementation of a variant of the method of the invention featuring predetermination of the number of readers of the plurality to be synchronized in the next synchronization cycle CS.

The program associated with the CSL synchronization circuit 20 and the readers 12*a*, 12*b* and 12*c* incorporates the infinite loop shown in FIG. 2. The protocol for transferring the numbers TxL to the CSL circuit 20 used by the reader is shown in FIG. 3 and the protocol for collecting the numbers TxL used by the CSL circuit 20 is shown in FIG. 4.

With regard to the infinite loop of FIG. 2, once the CSL circuit 20 has been powered up, it first of all collects the numbers TxL from each of the readers of the plurality 12, retaining only active readers, for which the number TxL is greater than 0 (step 201). As a function of the number Nx of readers for which TxL >0, the CSL circuit 20 synchronizes three readers (step 202), two readers (step 203) or only one reader (step 204).

The program of the CSL synchronization circuit 20 has three 8-bit logic ports DATA(1-3) which the CSL circuit uses to read the values placed on the DATA lines by the three readers 12*a*, 12*b* and 12*c*. The CSL circuit also has a logic gate BUSY_REQUEST which it uses to read simultaneously the values on the BUSY and REQUEST lines connected to the three readers.

The program of the CSL synchronization circuit 20 also uses the following variables in the protocol for collecting TxL shown in FIG. 4:

a three-entry table TxL(1-3), which stores the numbers TxL coming from the three readers;

a three-entry table TxLSET(1-3);

the auxiliary variable D.

The tables TxL and TxLSET are reset to ‘0’ at the end of each synchronization cycle CS. A ‘1’ in the $i^{th}$ entry of TxLSET signifies that the transfer of the number TxL for the $i^{th}$ reader is finished.

The synchronization process shown in FIG. 3 (on the side of the reader 12*a*, 12*b* or 12*c*, hereinafter referred to as the $i^{th}$ reader) and in FIG. 4 (on the side of the CSL circuit 20, by an iterative process for which i spans the range from 1 to NL=3 in this example) is described next.

After receiving a command from the computer OH 18, the $i^{th}$ reader places a ‘1’ on the BUSY line (step 301), thereby informing the CSL synchronization circuit 20 of its intention to participate in the synchronization cycle CS. If the higher byte of its number TxL has a null value (condition 301'), the $i^{th}$ reader transfers the lower byte of its TxL by placing that byte on the DATA lines (step 302), and then by placing a ‘1’ on the REQUEST line (step 303). After the ‘1’ is detected on the request line of the $i^{th}$ reader (step 401), the CSL circuit 20 reads the value of the port DATA(i) (step 402); as this does not have a null value, the CSL circuit places it in the lower byte of TxL(i) and writes a ‘1’ in TxLSET(i) (step 403), the TxL transfer thus being completed for the $i^{th}$ reader.

If the higher byte of its TxL is does not have a null value (condition 301'), the $i^{th}$ reader places a ‘0’ on the DATA lines (step 304), and then places a ‘1’ on the REQUEST line (step 305). After the ‘1’ has been detected on the REQUEST line of the $i^{th}$ reader (step 401), the CSL circuit 20 reads the value of the port DATA(i) (step 402); this having a null value and the two conditions TxL(i)=0 and TxLSET(i)=0 being satisfied, the CSL circuit knows that the transfer of a number TxL on 16 bits must follow. To this end, the CSL circuit places a ‘1’ on the START line of the $i^{th}$ reader (step 405); in response (condition 305'), the $i^{th}$ reader transfers the higher byte of its TxL by placing that byte on the DATA lines (step 306) and then placing a ‘0’ on the REQUEST line (step 307). Following the ‘0’ detected on the REQUEST line (condition 405'), the CSL circuit 20 places the value of DATA(i) in the higher byte of TxL(i) (step 406), and then resets the START line of the $i^{th}$ reader to ‘0’ (step 407). In response to the ‘0’ on the START line (condition 307'), the $i^{th}$ reader transfers the lower byte of its TxL by placing that byte on the DATA lines (step 302) and then placing a ‘1’ on the REQUEST line (step 303). Following the ‘1’ detected on the REQUEST line of the $i^{th}$ reader, CS reads the value of the port DATA(i) (step 402); even if the latter is a null value (it is perfectly possible for the lower byte of TxL to have a null value if the higher byte does not), the conditions TxL(i)>0 and TxlSET(i)=0 (condition 402') inform the CSL circuit that it is now a question of transferring the lower byte of TxL; consequently, the CSL circuit 20 places the value of DATA(i) in the lower byte of TxL(i) and writes a ‘1’ in TxLSET(i) (step 403), this completing the TxL transfer for the $i^{th}$ reader.

At this point the $i^{th}$ reader begins to wait for permission to send the command to the microcircuits (execution of the transmit operation Tx). To this end it resets the BUSY line to ‘0’, whilst maintaining the ‘1’ on the REQUEST line (step 308). Permission is granted by the CSL circuit placing a ‘1’ on the START line of the $i^{th}$ reader (condition 308'); at this time, the $i^{th}$ reader resets its REQUEST line to ‘0’(step 309), then places a ‘1’ on its BUSY line (step 310). The reader then executes its Tx/Rx cycle, sends its command to the microcircuits and receives the response. This completes the current Tx/Rx cycle.

However the START signal for the $i^{th}$ reader will be sent only upon the synchronization process proper (with the distribution of the START signals as a function of the numbers TxL) following the iterative process shown in FIG. 4 (collection of the numbers TxL) has ended, i.e. after interrogation of all the other readers of the plurality of readers (condition 407'). If any of the readers is inactive, i.e. with the signals REQUEST=0 and BUSY=0 (conditions 401' and 401"), that reader is excluded from the synchronization process proper executed afterwards and the values Txl(i) and TxlSET(i) are set to ‘0’ (step 408). Finally, the synchronization process proper commences after the step 404 of ending the collection of the numbers TxL, once the double condition is satisfied that at least one REQUEST signal is equal to 1 and the three BUSY signals are equal to zero (condition 407").

If the command from the computer OH 18 necessitates another Tx/Rx cycle, the fact that the ‘1’ has been retained on the BUSY line guarantees the participation of the $i^{th}$ reader in the synchronization cycle CS to follow the current cycle CS.

After completing all the Tx/Rx cycles required to execute the command from the computer OH 18, the $i^{th}$ reader normally resets its BUSY line to ‘0’, thereby informing the CSL circuit 20 that it has become inactive. Another synchronization cycle CS could commence without the participation of the $i^{th}$ reader. If the latter receives a command from the computer OH 18 during the execution of a synchronization cycle CS in which it is not participating, it will be obliged to wait for the next cycle CS. If there are situations in which this is not desirable, an alternative embodiment (not shown) includes a Delayed Reset mode in respect of the BUSY line. In this mode, the reader does not reset the BUSY line to ‘0’ immediately after completion of execution of the command from the computer OH 18, but with a time-delay of approximately 80 milliseconds. This time-delay enables the computer OH 18 to send a new command immediately to the reader, which will therefore not miss the next synchronization cycle CS. If the computer OH 18 does not wish to send a new command, it can request the reader to reset the BUSY line to '0'.

Commands from the computer OH 18 having the object of connecting power to and disconnecting power from the antennas 13*a*, 13*b* and 13*c* do not contain any real Tx/Rx cycle. However, these commands are preferably also synchronized. To this end, the reader indicates to the CSL circuit a simulated value of TxL of sufficient duration for the antenna current to stabilize, and then executes the command concerning the current (command CA simulating a transmit operation Tx) after reception of the START signal.

The CSL synchronization circuit 20 also commences the synchronization of the current cycle CS at the moment at which all the BUSY lines coming from the three readers 12*a*, 12*b* and 12*c* are set to '0'. This condition is distinguished from the situation in which all the readers are idle in that there is at least one REQUEST line at '1'. The synchronization process depends on the number of readers participating in the current synchronization cycle CS, which is equal to the number Nx of non-null values TxL that have just been transferred.

The synchronization process in the case of three participating readers (Nx=NL=3) is described next (see FIG. 2):

The values of the numbers TxL are put into order. A three-entry table READERS(1-3) is used for this purpose, the numbers of the three readers (12*a*, 12*b* or 12*c*) being written into these entries so that TxL(READERS(1))>=TxLREADERS(2))>=TxL(READERS(3)).

A '1' is placed on the START line of the reader whose number is written in READERS(1), corresponding to sending the instruction to execute the Tx/Rx cycle of the reader for which the transmit operation Tx to send the command instruction takes longest (first reader launched)

There is then a wait for a time equal to (TxL(READERS(1))−TxL(READERS(2))) times the period of the carrier, corresponding to the delay in sending the instruction to execute the Tx/Rx cycle of the second reader relative to the first reader launched.

A '1' is placed on the START line of the reader whose number is written in READERS(2) (second reader launched).

There is then a wait for a time equal to (TxL(READERS(2))−TxL(READERS(3))) times the period of the carrier, corresponding to the delay in sending the instruction to execute the Tx/Rx cycle of the third reader relative to the second reader launched.

A '1' is placed on the START line of the reader whose number is written in READERS(3) (third reader launched).

There is then a wait [T] for the BUSY lines of all three readers to be at '1'.

The START lines of the three readers are reset to '0'.

The tables TxL(1-3) and TxLSET(1-3) are reset to '0'.

The process is similar in the case of two participating readers, the only difference being that it concerns two readers instead of three.

In the case of a single participating reader, the process consists in giving the START signal immediately, waiting [T] for the BUSY line of the reader to go to '1', resetting the START line of the reader to '0', and resetting the tables TxL(1-3) and TxLSET(1-3) to '0'.

It is to be noted that the invention is not limited to a plurality NL of three readers and may be implemented with a greater number of readers provided that the circuits and the software are modified accordingly, on the basis of the information given hereinabove, and provided that the commands sent by different readers do not significantly interfere with each other.

It is also to be noted that the invention is not limited to contactless radio-frequency reading and/or writing of electronic microcircuit casino and gaming room chips, but applies to all applications involving contactless RFID reading/writing of tokens, plates or electronic microcircuit cards (by way of non-limiting example: access tokens or cards, electronic vouchers or labels, etc.).

Nor is the invention limited to the readers and/or the reader/microcircuit and microcircuit/reader communication protocol using Tx/Rx cycles described hereinabove. The method of coordinated management of a plurality of readers and the synchronization process of the invention are applicable i) to all readers using a communication protocol of the type in which commands are sent by the reader followed by responses sent by the microcircuits, which responses may be automatic and immediate (as in the Tx/Rx cycle described hereinabove) or automatic and non-immediate, or with sending time-controlled; and ii), optionally, to all readers using commands to disconnect power from the antennas, the electronic microcircuits being adapted to the readers, from the hardware and software point of view, in each of the situations referred to above.

The invention claimed is:

1. A method for coordinated management of a plurality of contactless radio-frequency readers of chips incorporating electronic microcircuits, the method comprising:

transmitting, in a first time interval, transmit operations composed of command instructions from each of the plurality of readers to the electronic microcircuits of the chips associated with each respective reader; and receiving, in a second time interval, receive operations composed of responses from the electronic microcircuits of the chips associated with each respective reader, wherein the first and second time intervals do not overlap, wherein each of the plurality of readers are active readers, whereby the active readers are synchronized to group their respective transmitting and receiving into distinct time intervals, and wherein a synchronization process includes:

collecting durations of the transmit operations for sending the command instructions of first transmit/receive cycles of the active readers; and sending the active readers instructions to execute the transmit operations for sending the command instructions of transmit/receive cycles spread over time and in order of decreasing duration of the transmit operations, beginning with the reader assigned the command instruction of the transmit/receive cycle having a greatest duration, a delay between executing one instruction and the next being equal to a difference between the durations of the transmit operations of the transmit/receive cycle command instructions to be transmitted by the corresponding two readers, up to executing the instruction associated with the shortest duration of the transmit operations.

2. The method in accordance with claim 1, wherein the transmit operations are grouped to finish at a substantially same time.

3. The method in accordance with claim 1, wherein the synchronization process further includes synchronizing instructions for connecting power to or disconnecting power from the antenna of at least one reader of the plurality of readers, wherein the synchronizing instructions simulate command instructions of a transmit/receive cycle to an active reader, wherein a time for the antenna current to stabilize after execution of a synchronizing instruction simulating the duration of the transmit operation sending the transmit/receive cycle command instruction to the active reader forms a simulated duration, and the synchronizing instruction forms a simulated transmit operation, and wherein an instruction to execute a synchronizing instruction forms a simulated instruction to execute a transmit operation of a transmit/receive cycle in which the receive operation has a null duration, thus forming a simulated transmit/receive cycle.

4. The method in accordance with claim 1, wherein at the durations comprise multiples of a period of a carrier used by the readers.

5. The method in accordance with claim 3, wherein at the simulated durations take the form of multiples of a period of the carrier used by the readers.

6. The method in accordance with claim 1, wherein the synchronization process is effected by a synchronization circuit in accordance with a synchronization cycle initiated by one of:

a first request for authorization to execute one of a real or the simulated transmit/receive cycle submitted by a reader following a request from a central control unit of the reader, or automatically at an end of a last receive operation of real transmit/receive cycles corresponding to a preceding synchronization cycle or, if there is no real transmit/receive cycle, at an end of the simulated transmit operations.

7. The method in accordance with claim 6, wherein all the readers that have transmitted requests for authorization to execute real or simulated transmit/receive cycles since a start of execution of the preceding synchronization cycle participate in a new synchronization cycle.

8. The method in accordance with claim 7, wherein all active readers that have participated in the preceding synchronization cycle also participate in the new synchronization cycle.

9. The method in accordance with claim 6, wherein, for each synchronization cycle, the collecting of real and/or simulated durations is effected for all the readers, with determination of a number of readers for which an instruction to execute the real or simulated transmit operation must be sent, and the sending of instructions to execute the transmit operation is adapted as a function of the said number of readers.

10. The method in accordance with claim 1, wherein clock signals of each reader of the plurality of readers are synchronized to a same timebase.

11. The method in accordance with claim 1 being adapted for use with readers having a function of detecting and managing collisions at a level of simultaneous responses of a plurality of microcircuits to a same command instruction of a transmit/receive cycle, wherein the method is associated with a device adapted to implement the following accelerated collision management process:

upon detecting a collision by virtue of a mismatch between the value '0' or '1' of a bit of a response and an expected value for that bit, determining the "strong" or "weak" nature of the collision as a function of the level of uncertainty as to the detected value of the response bit concerned; and iteratively processing collisions, wherein only "strong" collisions are processed on the first iteration.

12. The method in accordance with claim 11, wherein discrimination between "strong" and "weak" collisions is obtained by fixing for each reader a predetermined sharing threshold associated with the level of uncertainty as to the detected value of the response bit concerned.

13. The method in accordance with claim 12, wherein the sharing threshold is selected to distinguish between real collisions, "strong" collisions resulting from simultaneous responses from a plurality of microcircuits separate from false collisions, and "weak" collisions resulting from electromagnetic interference external to the readers or interference between readers with antennas in close proximity during sending of the responses.

14. A synchronization circuit for a plurality of contactless radio-frequency readers of chips incorporating electronic microcircuits adapted to implement a method including transmitting, in a first time interval, transmit operations composed of command instructions from each of the plurality of readers to the electronic microcircuits of the chips associated with each respective reader, and receiving, in a second time interval, receive operations composed of responses from the electronic microcircuits of the chips associated with each respective reader, such that the first and second time intervals do not overlap, and each of the plurality of readers are active readers, whereby the active readers are synchronized to group their respective transmitting and receiving into distinct time intervals, and such that a synchronization process includes collecting durations of the transmit operations for sending the command instructions of first transmit/receive cycles of the active readers, and sending the active readers instructions to execute the transmit operations for sending the command instructions of transmit/receive cycles spread over time and in order of decreasing duration of the transmit operations, beginning with the reader assigned the command instruction of the transmit/receive cycle having a greatest duration, a delay between executing one instruction and the next being equal to a difference between the durations of the transmit operations of the transmit/receive cycle command instructions to be transmitted by the corresponding two readers, up to executing the instruction associated with the shortest duration of the transmit operations, the synchronization circuit comprising:

a microprocessor-based processing unit structured and arranged to effect the synchronization; and an interface circuit structured and arranged to be readily connectable to each of the readers of said plurality of readers.

15. The synchronization circuit in accordance with claim 14, wherein the interface circuit includes a device for demultiplexing data transmission lines from the readers.

16. The synchronization circuit in accordance with claim 14, wherein the interface circuit includes a device for delivering to the readers clock signals synchronized to a timebase of the processing unit.

17. A system of contactless radio-frequency read/write readers of chips incorporating electronic microcircuits, comprising:

a plurality of readers;

a synchronization circuit being coupled to the plurality of readers and adapted to implement a synchronization of transmit/receive cycles of the plurality of readers to collect durations of the transmit operations for sending command instructions of first transmit/receive cycles of active readers, and to send the active readers instructions to execute transmit operations for sending the command instructions of transmit/receive cycles spread over time and in order of decreasing duration of the transmit operations, beginning with a reader assigned the command instruction of the transmit/receive cycle having a greatest duration, a delay between executing one instruction and the next being equal to a difference between the durations of the transmit operations of the transmit/receive cycle command instructions to be transmitted by the corresponding two readers, up to executing the instruction associated with a shortest duration of the transmit operations; and a microprocessor based central control unit structured and arranged to manage the synchronization circuit.

18. A system of contactless radio-frequency read/write reader of chips incorporating electronic microcircuits, comprising:

a plurality of readers; and a synchronization circuit structured and arranged to synchronize transmit/receive cycles of the readers to collect durations of the transmit operations for sending command instructions of first transmit/receive cycles of active readers, and to send the active readers instructions to execute transmit operations for sending the command instructions of transmit/receive cycles spread over time and in order of decreasing duration of the transmit operations, beginning with a reader assigned the command instruction of the transmit/receive cycle having a greatest duration, a delay between executing one instruction and the next being equal to a difference between the durations of the transmit operations of the transmit/receive cycle command instructions to be transmitted by the corresponding two readers, up to executing the instruction associated with a shortest duration of the transmit operations and including a clock signal switching device for switching from an internal timebase to a timebase of a central processing unit.

* * * * *